April 29, 1969     G. E. JOHNSTON ET AL     3,441,705
FLUID MANIFOLD FOR ELECTRICAL DISCHARGE MACHINING APPARATUS
Filed April 19, 1965
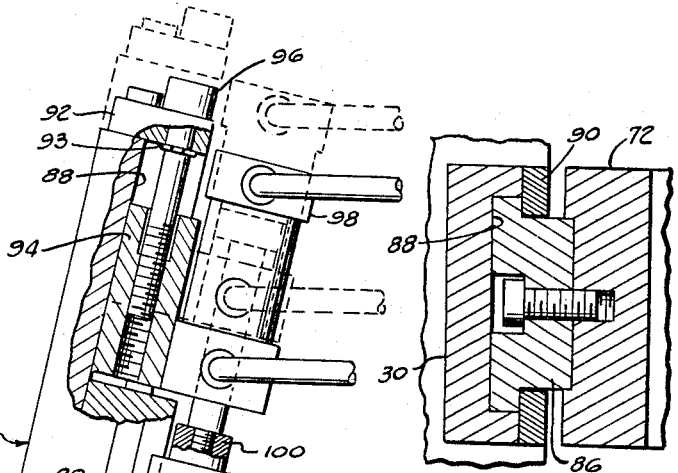
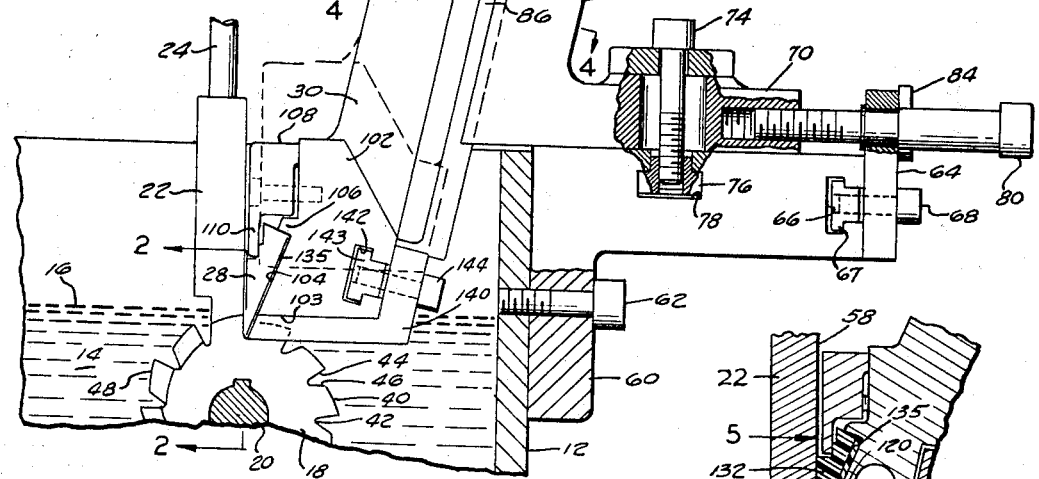
INVENTORS
GLENN E. JOHNSTON
MEREDITH M. WINDSOR
BY *Olsen and Stephenson*
ATTORNEYS

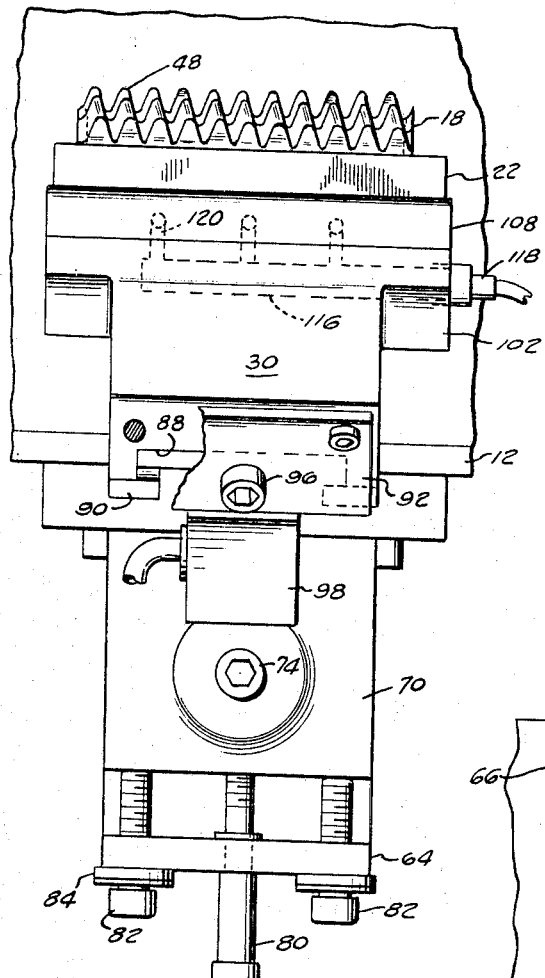
FIG. 6
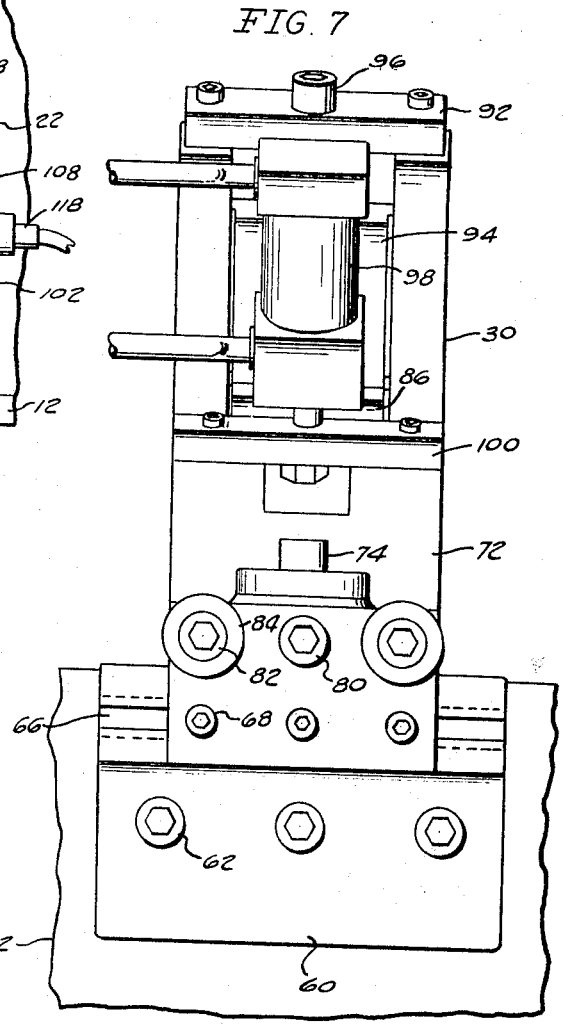
FIG. 7
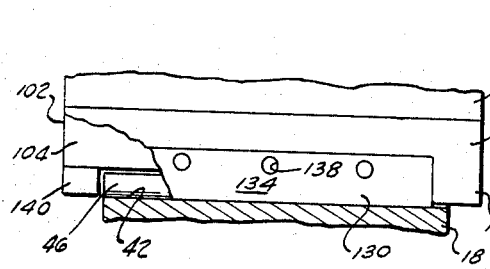
FIG. 5
FIG. 8
INVENTORS
GLENN E. JOHNSTON
MEREDITH M. WINDSOR
BY *Olsen and Stephenson*
ATTORNEYS

United States Patent Office 3,441,705
Patented Apr. 29, 1969

3,441,705
FLUID MANIFOLD FOR ELECTRICAL DISCHARGE MACHINING APPARATUS
Glenn E. Johnston, Birmingham, and Meredith M. Windsor, Detroit, Mich., assignors to Star Cutter Company, Farmington, Mich., a corporation of Michigan
Filed Apr. 19, 1965, Ser. No. 449,196
Int. Cl. B23k 9/18
U.S. Cl. 219—69            6 Claims

ABSTRACT OF THE DISCLOSURE

Apparatus for forming milling cutters, such as hobs, by the electrical discharge machining process in which a manifold is provided for discharging dielectric flushing and cooling fluid through the discharge gap between the electrode and the workpiece. The manifold is mounted for movement between an operative position in which it extends into a flute between the rows of teeth on the workpiece and an inoperative position in which it is out of the path of travel of the workpiece during indexing.

---

This invention relates to electrical discharge machining of milling cutters and in particular to a manifold for supplying dielectric fluid to a discharge gap during a machining operation.

Milling cutters such as a hob or the like can be formed by electrical discharge machining. A hob has a generally cylindrical body formed with a plurality of identical teeth which lie in a helical path about the circumferential surface of the body and are arranged in circumferentially spaced rows which extend generally longitudinally of the body. The hob is formed from a roughed-out hob having radial lands that extend longitudinally of the blank and are spaced circumferentially of the hob by radial flutes. Each land is machined into a row of teeth by means of an electrode having a lower working surface formed to the inverse shape of the desired final shape of each row of teeth. The roughed-out hob is supported for rotation in a tank with the hob immersed in a dielectric fluid, as for example, a light oil. A servo mechanism moves the electrode into a discharge position relative to the circumferential face of a land and maintains a very narrow gap in the order of 0.001 inch. When a sufficiently high voltage is applied across the gap, electrical discharges occur. With each discharge small amounts of material are removed from both the workpiece and the electrode. The discharges are repeated thousands of times per second with the servo mechanism maintaining the required gap while simultaneously moving the electrode progressively inward of the blank until a row of teeth is machined to a desired shape.

One such electrical discharging machining apparatus is disclosed in a United States patent application Ser. No. 203,241, entitled, "Method and Apparatus for Accurately Machining Hobs and the Like," filed June 18, 1962, in the name of Glenn E. Johnston et al., now Patent No. 3,205,335. In the apparatus disclosed in the Johnston et al. application, the hob is sequentially indexed to positions where each land is sequentially and accurately aligned with the working surface of the electrode. After the teeth are formed in one land, the electrode is raised and the hob is rotatably indexed to a position where the next adjacent land is accurately aligned with the electrode. Additionally with the method and apparatus disclosed in the Johnston et al. application, the teeth in each land are formed, in effect, by a two stage operation. The teeth are first rough-formed during a first downward travel of the electrode. The electrode is then raised, dressed to a precise inverse shape of the teeth, and then lowered into a discharge position for final machining of a row of teeth.

The dielectric fluid performs several important functions in addition to serving as a dielectric to control the discharge across the gap. The fluid serves as a coolant, a flushing medium to wash particles of removed material from the gap, and a source of elements, for example carbon and hydrogen, which assist the machining operation. The fluid also resists expansion of a gas bubble which occurs during a discharge and thus increases pressure at the discharge. The serrated form of the gap in electrical discharge machining of hobs or the like presents a tortuous path for the dielectric fluid in which the hob is immersed. Rather than rely solely on the availability of dielectric fluid in which the hob is immersed, it is highly desirable to provide some additional means for pumping dielectric fluid into the discharge gap to assure that sufficient fluid is available during a discharge.

This invention contemplates electrical discharge machining of a milling cutter such as a hob or the like while supplying dielectric fluid to the discharge gap by means of a fluid manifold that provides effective control of fluid supplied to the gap and thus assures a sufficient quantity of dielectric fluid in the gap during the discharge; that does not interfere with the electrode during machining of a land or indexing of the hob between the machining of successive lands; that is constructed simply and economically; and that is readily usable with various shapes and sizes of milling cutters.

Further objects, features and advantages of this invention will become apparent from a consideration of the following description, the appended claims, and the accompanying drawing in which:

FIGURE 1 is a side elevation view of a hob, an electrode, and a portion of a dielectric fluid tank with a fluid manifold assembly constructed in accordance with the present invention mounted on the tank and being illustrated in a position engaging the electrode and the hob during a machining operation, with portions of the manifold assembly broken away;

FIGURE 2 is a fragmentary vertical section taken along the line 2—2 in FIG. 1 through the discharge outlet of the manifold to illustrate the position of the outlet relative to the discharge gap between the hob and the electrode;

FIGURE 3 is a fragmentary vertical transverse section taken on the line 3—3 of FIG. 2;

FIGURE 4 is a generally horizontal sectional view taken on line 4—4 of FIG. 1 to illustrate a slide in the manifold assembly for retracting the manifold to a position where it does not interfere with movement of the electrode or indexing of the hob;

FIGURE 5 is a vertical section taken on line 5—5 of FIG. 3 to further illustrate the construction of the manifold;

FIGURE 6 is a top view of the manifold assembly illustrated in FIG. 1;

FIGURE 7 is a view of the manifold assembly taken from the right as viewed in FIG. 1; and FIGURE 8 is a diagrammatic view of a servo for controlling the motion of the electrode and the manifold assembly.

Referring to FIG. 1, a portion of an electrical discharge machining apparatus is illustrated as generally comprising a tank 12 which is open at its upper end and filled with dielectric fluid 14 to a level 16. A roughed-out hob 18 is supported in tank 12, immersed in the dielectric fluid 14, by suitable means such as a headstock (not shown) and a tailstock (not shown) operatively connected to an arbor 20 keyed in hob 18 so that the hob can be rotatably indexed during a machining operation. An electrode 22 fastened on a holder 24 is supported above tank 12 for vertical movement into and out of operative machining positions on the hob 18. Mounted on tank 12 is a fluid manifold assembly 26 for supplying dielectric fluid to a discharge gap between electrode 22 and blank 18 during a machining operation. The manifold assembly 26 generally comprises a manifold member 28 carried on the lower end of a holder 30 which in turn is mounted on a base 32 for rectilinear motion between raised and lowered positions into and out of engagement with hob 18. Base 32 is in turn fastened on tank 12. Tank 12, hob 18, electrode 22 and the other portions of an electrical discharge machining apparatus (not shown) are substantially identical to that disclosed in the aforementioned Johnston et al. patent application, wherein the construction and operation of the apparatus for machining hob 18 are disclosed in greater detail.

Although the manifold assembly 26 is useful in electrical discharge machining of various milling cutters, a hob is shown for purposes of illustration. Prior to electrical discharge machining, hob 18 has been rough-formed with a plurality of radial lands 40 that extend longitudinally between the ends of the hob and are spaced circumferentially of the hob by radial flutes 42 which also extend between the ends of the hob. In FIG. 1 that portion of hob 18 in a counterclockwise direction from electrode 22 has been discharge machined whereas in a clockwise direction from electrode 22, hob 18 is in a rough stage. Each flute 42 has a generally V-shaped radial cross section so that each land 40 has a flat radial leading face 44 and a radially inclined trailing face 46. During electrical discharge machining each of the lands 40 is formed into a row of teeth 48 (FIGS. 1, 2 and 6) extending longitudinally of the hob. The teeth 48 in each row are offset longitudinally of the hob relative to the teeth in adjacent rows so that the teeth are arranged in a generally helical path about the circumference of the hob.

With hob 18 properly positioned, as shown in FIG. 1, electrode 22 is vertically aligned with one of the lands 40. Suitable means such as a hydraulic cylinder 50 (FIG. 8) under the control of a servo 52 are used to move electrode 22 in very precise manner during discharge machining. Electrode 22 is fashioned with a plurality of transverse grooves 54 (FIG. 2) to provide a lower working face 56 whose serrated contour is substantially inverse to the contour of a row of teeth 48. During a machining operation, the leading face 44 on a land 40 is vertically aligned with a front face 58 on electrode 22 while electrode 22 is moved radially inwardly of hob 18 by servo 52 in a very precise manner to maintain a very precise gap 59 between face 56 and teeth 48 as the teeth are formed. Gap 59 may be in the order of 0.001 inch and therefore appears as a line in the drawings. As set forth in the aforementioned Johnston et al. application, teeth 48 may be machined in two stages, that is, by first rough machining after which the electrode is raised, face 56 is dressed, and then the electrode is again lowered into discharge position with hob 18 for final forming of the teeth 48.

Referring to the fluid manifold assembly 26 in greater detail, base 32 is fashioned with a downwardly depending flange 60 which is fastened on tank 12 as by screws 62. A vertical support 64 is fastened on base 32 at its rear end (the right end as viewed in FIG. 1) for lateral or horizontal adjustment by means of a T slot 66, a T block 67 and screws 68. Disposed on the upper face of base 32 is a horizontally slidable block 70 which is fashioned at its forward portion with an upstanding support member 72. Block 70 is fastened on base 32 for lateral adjustment by means of a screw 74 threaded in a T block 76 which rides in a T slot 78 formed in the base 32. Block 70 is adjusted in a horizontal direction toward and away from tank 12, from right to left as viewed in FIG. 1, by means of a lead screw 80 threaded in the rear of block 70 and axially fixed and rotatably mounted in plate 64. Block 70 is locked in a selected adjusted position by means of stop screws 82 threaded in nuts 84 which are fastened on plate 64.

Member 72 on the forward portion of block 70 projects in a direction upwardly and slightly rearwardly from tank 12 with the lower end of member 72 disposed over tank 12. Fastened on the front of member 72 is a T slide block 86 which extends longitudinally in a direction vertically inclined to tank 12 with the lower end of the block 86 projecting downwardly and forwardly into tank 12 toward hob 18. Block 86 rides in a guide 88 formed longitudinally in holder 30 and is retained in the guide by longitudinal guide strips 90 fastened on holder 30. The upper open end of guide 88 is closed by a plate 92 fastened on the top of holder 30. A second T slide block 94 is slidably disposed in guide 88 above block 86 and is adjustably fastened to holder 30 by a lead screw 96. Screw 96 is axially fixed and rotatable in plate 92, as by a snap ring 93, and has its lower end threaded in block 94 so that rotation of screw 96 adjusts holder 30 vertically on block 86. A fluid cylinder 98 fastened on a rear exposed portion of block 94 has a piston rod extending downwardly from the cylinder with its lower end threaded in a cross bar 100 fastened on the top of member 72. Cylinder 98 is operatively connected to a fluid source as by the servo control 52 for actuating cylinder 98 to move holder 30 and manifold 28 to a raised position where manifold 28 will not interfere with movement of electrode 22 or indexing of blank 18 and to a lowered position with manifold 28 bottomed in one of the flutes 42 to supply fluid to the gap during a discharge machining operation.

Holder 30 is fashioned at its lower end with an enlarged head 102 which is recessed longitudinally to provide a flat horizontal face 103 and a front face 104 inclined upwardly and rearwardly. At the top of face 104, head 102 is fashioned with a forwardly projecting stop 106 which positions manifold 28. A front plate 108 is fastened on the forward portion of head 102 and is fashioned with a downwardly depending flange 110 which engages manifold 28 to retain the manifold in place. In the lower part of head 102 is a lateral passageway 116 having one end which opens at one side of head 102. The other end of passageway 116 is closed. The open end of passageway 116 is provided with a fitting 118 for connecting passageway 116 to a supply of dielectric fluid. Three smaller passageways 120 in head 102, spaced along and communicating with passageway 116, open at face 104 to connect passageway 116 to manifold 28.

Preferably manifold member 28 is of two-piece construction and comprises a flat plate 130 and a block 132. The lower portion of block 132 is in the form of a generally triangular prism extending longitudinally in a horizontal direction to form a flat front face 133 (FIG. 5) and an upwardly and rearwardly inclined rear face 135. Plate 130 is longitudinally coextensive with and secured on block 132 against face 135. Block 132 has a large, generally rectangular, central recess 134 which is concave upwardly and opens at the front, the rear, and the bottom of the block leaving downwardly depending legs 136 at opposite ends of the block. Recess 134 has a length slightly less than the length of the land 40 on the roughed-out hob 18 and the width of electrode 22. Recess 134 has a height dimension such that when the manifold 28 bottoms in one of the flutes 42 the top of the recess is disposed above the gap 59 between surface 56 on the electrode 22 and land 40 on the hob 18. Thus face 133 abuts hob 18 and electrode 22 at both ends of the gap 59 and above the gap to form a substantially continuous marginal seal around the gap during a discharge machining operation. Although face 133 covers short portions of the gap 59 at each end of the hob 18, for example a distance in the order of one tooth, some fluid from recess 134 is forced longitudinally along the gaps, out of the ends of the gap and into tank 12. Additionally, the ends of hob 18 are machined after teeth 48 are formed as illustrated in broken lines designated by numeral 137 (FIG. 2). In the preferred embodiment block 132 is made of nylon and plate 130 is made of Teflon. With this construction face 133 on block 132 will seal properly against the front face 58 of electrode 22 and the leading face 44 of land 40 and plate 130 will seal against the next adjacent land 40 while providing a rigid assembly. Plate 130 has three apertures 138 that register with passageways 120 so that recess 134 is connected with passageway 116 and thence to a source of dielectric fluid.

Leg portions 136 on the manifold body 132 are disposed outwardly of opposite ends of hob 18. A pair of angled support arms 140 are each adjustably fastened on head 102 by means of a T slot 142, a T block 143 and a screw 144. Each of the arms 140 extends forwardly beneath the bottom face 103 of head 102 and abuts plate 130 in line with respective leg portion 136. As viewed in FIG. 5, arms 140 are disposed longitudinally outwardly of hob 18 and can be adjusted longitudinally of the hob to support plate 130 and block 132 for hobs having different lengths.

During a machining operation, for example of the type disclosed in the aforementioned Johnston et al. application, hob 18 is supported in tank 12 for machining by electrode 22. Manifold assembly 26 is set up on tank 12 so that when holder 30 is lowered by cylinder 98, manifold 28 bottoms and fits closely in the flute 42 adjacent the land 40 that is to be machined. With manifold 28 properly positioned in flute 42, face 133 on body 132 abuts the leading face 44 on the land 40 and the front face 58 of electrode 22. Plate 130 is supported by the trailing face 46 on the adjacent one of the lands 40. Holder 30 is universally adjustable in horizontal directions by means including block 76, slot 78, block 67, slot 66 and screw 80. Holder 30 is adjusted vertically by means of screw 96 so that proper seating of manifold 28 in flutes 42 can be obtained initially and adjusted during use, if required in a simple manner.

Electrode 22 is lowered into a discharge position with one of the lands 40 and then cylinder 98 is actuated to lower manifold 28 into position. Cylinder 98 together with the block 94, holder 30 and manifold 28 move downwardly so that manifold 28 bottoms or seats in the flute 42. Manifold 28 is yieldably held in this position due to continued pressure in the cylinder. Alternatively, cylinder 98 may be a single acting cylinder and suitable spring means may be provided to maintain manifold 28 in tight seating engagement with hob 18 during a machining operation. Fluid is supplied continuously to manifold 28 under pressure, through fitting 118, passageway 116, passageways 120 and recess 134. With face 133 sealed against hob 18 and electrode 22, fluid from recess 134 is forced through the discharge gap between electrode 22 and hob 18 to assure adequate fluid in the gap during machining. In a two step operation, such as disclosed in the Johnston et al. application, after rough forming of hob 18, manifold 28 is raised by cylinder 98 to the upper position shown in broken lines in FIG. 1 and then electrode 22 is raised, dressed, and again lowered into position for final machining. Manifold 28 is then lowered into position to supply fluid to the discharge gap during final machining. After final machining of one row of teeth 48, manifold 28 and electrode 22 are again raised and hob 18 is indexed in a counterclockwise direction as viewed in FIG. 1 for machining of the next row of teeth 48.

It will be understood that the manifold assembly for electrical discharge machining apparatus which is herein disclosed and described is presented for purposes of explanation and illustration and is not intended to indicate limits of the invention, the scope of which is defined by the following claims.

What is claimed is:
1. In an apparatus for forming a milling cutter or the like by electrical discharge machining of a blank having circumferentially spaced rows of radially extending teeth wherein said rows are spaced circumferentially of said blank by radial flutes, and wherein each row of said teeth has a generally flat radial face, an electrode mounted for movement into and out of discharge position relative to one of said rows, said electrode and a circumferential face of said one row having a discharge gap therebetween when said electrode is in said discharge position, a manifold assembly for supplying dielectric fluid to said gap during a machining operation, said assembly comprising a manifold member shaped to extend into one of said flutes and having a face adapted to abut said flat radial face on one of said rows and said electrode so as to form a substantially continuous marginal seal around at least a substantial portion of said gap, said manifold member having an internal recess open to said manifold member face, means connected to said manifold member for supplying dielectric fluid to said recess for flow through said manifold member face and said gap, and means mounting said manifold member for movement into and out of engagement with said electrode and said flat radial face on one of said rows in said blank.

2. The apparatus according to claim 1 wherein said blank is supported for rotatable indexing movement about a substantially horizontal axis, said electrode is mounted for movement along a substantially vertical path, and said manifold member is mounted for up and down movement along an inclined path disposed to one side of said electrode path of movement.

3. The apparatus according to claim 1 wherein said body is of generally triangular prismatic block shape having a lower edge disposed below said recess.

4. The apparatus according to claim 3 wherein said body is of generally V-shape in cross section and is formed of an electrically non-conductive material.

5. In an apparatus for forming a milling cutter or the like by electrical discharge machining of a blank having a plurality of radial lands extending longitudinally of said blank between opposite ends of said blank and being spaced circumferentially of said blank by radial flutes, each land having a generally flat radial face and a generally flat face inclined to said radial face with each of said flutes having a generally V-shaped radial cross section, means for supporting said blank for rotatable indexing about a horizontal axis, an electrode mounted for movement along a generally vertical axis into and out of discharge position with one of said lands, said electrode being arranged and adapted to be disposed above said one land to form a discharge gap during a machining operation, and a manifold for supplying dielectric fluid to said gap during a discharge operation, said manifold comprising a generally triangular prismatic member, said member having a flat vertical front face and a back face inclined upwardly and rearwardly from a lower edge of said member, said member further having a central recess concaved upwardly from said lower edge, the front of said recess opening at said front face, said member extending in opposite directions longitudinally of said member beyond said recess, said member having a V-shaped transverse cross section dimensioned to fit closely in one of said flutes with said front face abutting said electrode and said radial face on said one land and with said back face abutting the inclined face of an adjacent land.

6. The apparatus set forth in claim 5 further including a head supporting said manifold member, said head having a lower portion extending rearwardly from said manifold member above said lower edge thereof to clear said adjacent land when said manifold member is disposed in said one flute, said member extending outwardly in opposite longitudinal directions beyond the ends of said lands, and a pair of abutments on said head at opposite ends of said head, said abutments projecting below the lower portion of said head and engaging said manifold member longitudinally outwardly of said blank when said member is disposed in said one flute.

References Cited

UNITED STATES PATENTS

| | | | |
|---|---|---|---|
| 2,938,104 | 5/1960 | Paillarse | 219—69 |
| 3,061,708 | 10/1962 | Pfau | 219—69 |
| 3,144,541 | 8/1964 | Hill | 219—69 |
| 3,205,335 | 9/1965 | Johnston et al. | 219—69 |

FOREIGN PATENTS 806,106 12/1958 Great Britain.

RICHARD M. WOOD, *Primary Examiner.*

R. F. STAUBLY, *Assistant Examiner.*

U.S. Cl. X.R.

134—168; 239—597; 401—261